July 2, 1940.  A. M. STAUBLY  2,206,793

SUN VISOR

Filed Aug. 11, 1938

Inventor

Alan M. Staubly

Patented July 2, 1940

2,206,793

UNITED STATES PATENT OFFICE 2,206,793

SUN VISOR

Alan M. Staubly, Martinsburg, W. Va., assignor to Elizabeth Frankenberry and Lucy Frankenberry, Martinsburg, W. Va.

Application August 11, 1938, Serial No. 224,389

7 Claims. (Cl. 296—91)

My invention relates to improvements in sun visors for vehicles or other conveyances.

It has long been considered desirable to protect the windshield of vehicles from precipitation and from direct sun rays, in order to prevent impairment of visibility therethru. Sun visors, which until a few years ago accomplished this purpose, have been discarded in the automotive industry, as a result of the discovery that the type of visor heretofore used produced serious wind resistance at the higher vehicle speeds and also detracted from the stream-lined appearance of the conveyance. The modern automobile provides no protection for the windshield, and as a result, visibility therethru is very seriously impaired when direct sunlight, or other strong light, is refracted by such slight deposits of dust, mud, frost, etc., as would scarcely be noticeable on the visor-protected windshields of the cars of the last decade. The eye-strain and blinding effects so produced has led to the general use of so-called inside sun visors, which in reality are merely eye-shades and which experience has shown to be far from a satisfactory solution of the problem. My invention makes it possible for the automotive art to return to the old and satisfactory outside visor, by overcoming the disadvantages which led to its abandonment.

An object of my invention is to provide a visor for protecting a vehicle windshield without adding appreciably to the wind resistance of the vehicle.

Another object of the disclosure is to provide a visor for a conveyance windshield which adds to, rather than detracts from, the stream-lined appearance of the conveyance.

A further object of my invention is the provision of a stream-lined sun visor which is adjustable, either manually or automatically, to the slip-stream of the vehicle at various speeds.

A still further object of the disclosure is the provision of an external stream-lined sun visor of such construction that the same may be used as a radio antenna.

I attain these objects by the mechanism hereinafter described, and disclosed in the accompanying drawing in which.

Figure 1:
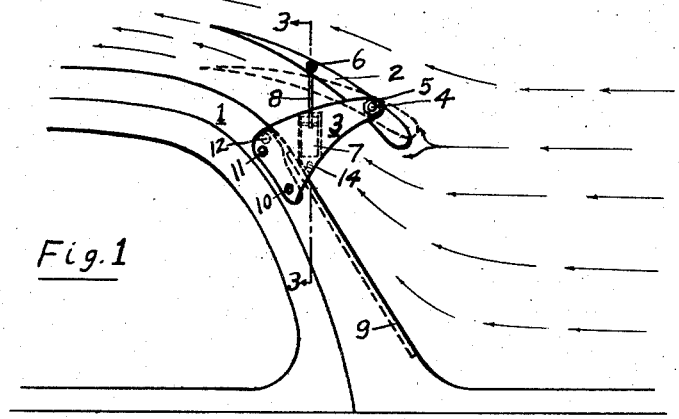
Fig. 1 is a side elevational view of a preferred embodiment of my invention.
Figure 2:
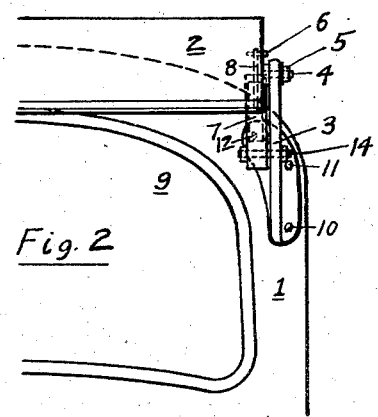
Fig. 2 is a front elevation of a portion of the device of Fig. 1.
Figure 4:
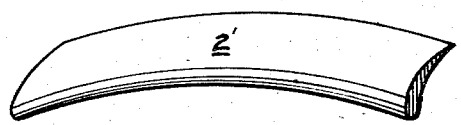
Figs. 4 and 5 are perspective views of alternative forms of visor elements.
Figure 5:
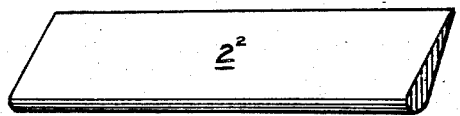

In the disclosure of Figs. 1 and 2, the numeral 1 designates the body of a conventional vehicle, having a rearwardly inclined windshield 9. Supported generally above and somewhat forwardly of the central, or "normal-vision," portion of the windshield, is a visor member 2. The visor member 2 of elongated form is preferably stream-lined or dirigible-shaped in transverse cross-section, but it is obvious that a relatively thin sheet-like visor would make a satisfactory substitute for the theoretically more desirable shape. The visor obviously should conform to the general configuration of the conveyance, its slip-stream, or both, and may be curved either transversely, longitudinally, or in both directions as shown in Fig. 4. It is also adaptable to the V or two-pane windshield either by the use of a similarly shaped visor or a plurality of the types shown in Figs. 1, 4 and 5.

The visor member is provided at its ends with supporting pins 4 attached thereto in any suitable manner. Brackets 3, which may be of any suitable material, such as steel, or electrically insulating material, are attached to the vehicle body by bolts 10, 11, 12, or other means. The brackets 3 have openings at their outer ends to receive the pins 4 to thereby support the visor 2 in spaced relation to the vehicle proper, thus permitting flow of the air, that would otherwise be trapped, between the visor and the vehicle body. The pins 4 may be threaded, if desired, to receive nuts 5 for holding the visor in a selected position, if tightened, or to prevent vibration, if left relatively loose for pivoting.

Since wind resistance at lower speeds is not a serious problem, a manually adjustable visor, or even a non-adjustable or factory-adjusted form should produce a satisfactory visor assemblage, if adjusted for some selected speed in the upper speed range of the car.

Figure 3:
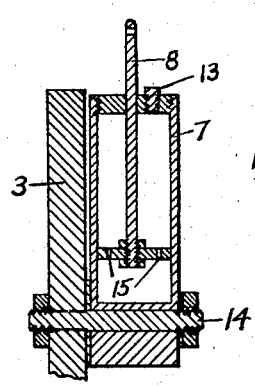
Fig. 3 is a detailed elevational cross-section taken along the line 3—3 of Fig. 1.

However, since in the partially stream-lined vehicles now in vogue the slip-stream varies with changes in speed, it is desirable to mount the visor for automatic adjustment to the changing slip-stream if minimum wind resistance at all speeds is desired. Such a construction would result if nuts 5 were left loose or were omitted. Figs. 1–3 disclose one form of this modification of the invention.

In the automatically adjustable variation it is preferable that the visor be so balanced about the pivot pins 4 that the forces tending to raise or lower the rear edge thereof are approximately equal. In order to prevent rapid oscillation, vibration or "whipping" of the visor, friction or damping means are provided. Friction in the bearings formed by pins 4, the openings in brackets 3 and the nuts 5 may be relied upon for this effect. The preferred form, however, comprises a dashpot 7 attached to the bracket 3 by a bearing bolt 14 about which it may rock slightly. Piston rod 8 is attached to the visor 2 by a pivot pin 6, and carries at its opposite end a piston provided with bleeder vents 15. The dashpot chamber may be filled with any suitable fluid, such as air or glycerin.

It is preferable that the rear edge of the visor in all of its adjusted positions should reach or traverse the plane of the front surface of the windshield proper. This arrangement both prevents light rays that pass between the visor and the body from striking the surface of the windshield, and also tends to protect the windshield from precipitation and settling dust.

The use of an external visor spaced from the vehicle body will permit the use of the former as a radio antenna if it is made at least in part of electrically conductive material, and if such electrically conductive portion is electrically insulated in any suitable manner from the vehicle body, as, for example, by making brackets 3 of insulating material. Other arrangements for accomplishing this result and the necessary electrical connections will be obvious to those skilled in the art.

I claim:

1. In a vehicle, a vehicle body including a windshield, a highly light obstructing visor positioned to shade at least the upper portion of said windshield against direct sunlight, pivotal mounting means for supporting said visor in spaced relation with said body and windshield for adjustment to the slip-stream of the air flowing over and around the body due to relative motion between said body and the air, and dashpot means for restraining oscillation of the visor with respect to its mounting means.

2. In a vehicle, a vehicle body including a windshield, a highly light-obstructing visor positioned to shade at least the upper portion of said windshield against direct sunlight, and adjustable mounting means for supporting said visor in spaced relation with said body and windshield, said adjustable means including mounting means so positioned on the visor that the air currents automatically adjust said visor to the slip-streams produced at the various speeds of the vehicle.

3. In a vehicle, a vehicle body including a windshield, a visor of highly light-obstructing material positioned to shade at least the upper portion of said windshield against direct sunlight, adjustable mounting means for supporting said visor in spaced relation with said body and windshield for adjustment to the air flowing over and around the body due to relative motion between said body and the air, said mounting means being so positioned on the visor that the air currents automatically adjust said visor to the slip-streams produced at the various speeds of the vehicle, and damping means for regulating the oscillation of the visor.

4. In a vehicle, a vehicle body including a windshield, a highly light-obstructing visor arranged to shade at least the upper portion of said windshield against direct sunlight, and adjustable means for supporting said visor in spaced relation with said body and windshield for adjustment to the slip-stream of the air flow over and around the body due to relative motion between said body and the air, said adjustable means including a mounting device so positioned on the visor that the air currents automatically adjust said visor to the slip-streams produced at the various speeds of the vehicle, and said visor being so balanced that the forces necessary to move the same to or from any of its positions are substantially equal.

5. In combination, a vehicle body including a windshield, supporting means carried by said body, and a highly light-obstructing visor supported by said supporting means in spaced relation with said body generally above and forwardly of the normal vision portion of said windshield, said supporting means being adapted and arranged to hold the visor fixedly in a predetermined position corresponding to the slip-stream developed at a particular speed, and said visor being of such cross-sectional configuration that there is a minimum resistance to the flow of air over and around the vehicle due to movement thereof relative to the atmosphere.

6. In combination, a vehicle body including a rearwardly inclined windshield, a highly light-obstructing visor of stream-lined cross-section, and supporting means for maintaining said visor fixedly in spaced relation with said body generally above and forwardly of the normal vision portion of said windshield and with its rearward edge extending at least to the plane of said windshield, the position of the visor corresponding to the slip-stream developed at a particular vehicle speed.

7. In combination, a vehicle body including a windshield, supporting means carried by said body, and a highly light-obstructing visor supported by said supporting means in spaced relation with said body generally above and forwardly of the normal vision portion of said windshield, said visor being so positioned and being of such cross-sectional configuration that the same offers a minimum resistance to the flow of air over and around the vehicle due to movement thereof relative to the atmosphere, and said supporting means including means for yieldingly supporting the visor for rocking motion to permit automatic adjustment to changing slip-streams.

ALAN M. STAUBLY.